United States Patent [19]

Krueger et al.

[11] Patent Number: 5,008,807

[45] Date of Patent: Apr. 16, 1991

[54] DATA PROCESSING APPARATUS WITH ABBREVIATED JUMP FIELD

[75] Inventors: Steven D. Krueger, Dallas; Michael J. Amundsen, Austin, both of Tex.

[73] Assignee: Texas Instruments Incorporated, Dallas, Tex.

[21] Appl. No.: 517,979

[22] Filed: Apr. 27, 1990

Related U.S. Application Data

[63] Continuation of Ser. No. 628,071, Jul. 5, 1984, abandoned.

[51] Int. Cl.$^5$ .......................... G06F 9/32; G06F 9/38; G06F 9/26
[52] U.S. Cl. ................. 364/200; 364/231.8; 364/254.1; 364/261.3; 364/262.4; 364/262.8
[58] Field of Search .......................... 364/200 MS File

[56] References Cited

U.S. PATENT DOCUMENTS

| | | | |
|---|---|---|---|
| 3,699,526 | 10/1972 | Iskiyan et al. | 364/200 |
| 3,793,631 | 2/1974 | Silverstein et al. | 364/200 |
| 4,130,869 | 12/1978 | Kinoshita et al. | 364/200 |
| 4,310,880 | 1/1982 | Gehman | 364/200 |
| 4,407,015 | 9/1983 | Ziobro | 364/200 |
| 4,415,969 | 11/1983 | Bayliss et al. | 364/200 |
| 4,438,492 | 3/1984 | Harmon, Jr. et al. | 364/200 |

OTHER PUBLICATIONS

Intel Corporation; *MCS-80/85 Family User's Manual;* Oct. 1979; pp. 1-1-1-5, 5-13, 5-14, 5-17.

*Primary Examiner*—Gareth D. Shaw
*Assistant Examiner*—Kakali Chaki
*Attorney, Agent, or Firm*—L. Joy Griebenow; James T. Comfort; Melvin Sharp

[57] ABSTRACT

The abbreviated jump field of the present invention enables each instruction word within the data processing apparatus to cause an instruction sequence branch to one of a limited number of destinations. Each instruction word of the data processing apparatus includes a limited number of bits which are decoded to specify one of a small set of instruction destinations. One of the possible destinations is the normal default destination of the next instruction word. In addition a relatively large number of branch instructions have been found to specify a rather limited number of destinations. In the preferred embodiment of the present invention the limited number of bits of the abbreviated jump field is employed to specify one of these widely used destinations. The widely used destinations may include a return instruction, a conditional skip of execution of the next instruction and various error handling and error recovery routines.

10 Claims, 4 Drawing Sheets

DATA PROCESSING APPARATUS WITH ABBREVIATED JUMP FIELD

This application is a continuation of application Ser. No. 628,071, filed July 5, 1984, now abandoned.

BACKGROUND OF THE INVENTION

The present invention relates to the field of digital computing systems and more particularly to the field of processing units for high speed and/or high capacity digital computing systems. Distal computing systems of this type often include data and instruction pipeline architecture in order to increase the speed of operation. A digital computing system with an instruction pipeline architecture includes a memory for storing a series of program instructions waiting to be executed. This is achieved by having the apparatus look ahead into the instruction memory and recall instruction words prior to the time they are needed for execution. In addition data such as later needed operands and results to be stored in memory may also be pipelined. These techniques can increase the rate at which the processing unit operates by reducing the delay needed for recall of the next instruction word to be executed. However, this pipelined architecture can cause control sequence problems for execution of branch instructions, particularly for the execution of conditional branch instructions.

It is typical of digital computing systems of this type to employ increased hardware resources in order to increase the speed of operation or the computing power of the system. One simple way to increase the machine resources is to operate on a relatively large data word. Digital computer systems of this type typically operate on 32 bit words, that is they are capable of doing simple operations such as a two word add or a two word logical AND or OR in a single instruction cycle. Additional hardware features may include the feature of hardware to perform a variable shift and mask operation in a single instruction cycle. Because digital computing systems of this type are often employed for computational intensive applications, any increase in speed and computing power of these systems would enhance their utility. Therefore, features such as increased use of the machine resources within a single instruction cycle or provision of hardware features to perform tasks previously performed by the use of software would be advantageous.

SUMMARY OF THE INVENTION

The present invention relates to a digital computing system which supports instruction words with abbreviated jump fields. Instruction words having abbreviated jump fields enable use of more of the machine resources during a single instruction cycle by utilization of parts of the processing unit which might ordinarily be idle during an instruction cycle. In accordance with the present invention, every instruction word may be a branch instruction. In order to limit the number of bits required in each instruction word, while still enabling every instruction to be a branch instruction, the abbreviated jump field of the present invention preferably includes a limited number of bits in order to specify only a small subset of the possible branch locations within the instruction memory. On the other hand, it has been found that a relatively larger proportion of the branching instructions for many digital computing apparatuses have a relatively few address destinations. Thus, increased utility is achieved at the expense of a relatively few number of bits.

One of the most frequently employed address destinations in branch instructions has to do with a program RETURN instruction. The end of any subroutine within an application program evokes such a RETURN instruction. This RETURN instruction causes the address at the top of a return stack to be placed in the program counter for resetting the program flow to the instruction following the subroutine CALL instruction.

Another jump destination which may be included within the limited number of destinations in the abbreviated jump field is a conditional skip instruction. A conditional skip instruction will skip the next following programs instruction if a condition is true. If the condition is not true, execution of the next following instruction would occur normally. This instruction may be particularly useful by providing an instruction in the conditionally skipped instruction based upon some data states, such as, for example, an absolute value function.

The limited number of jump destinations may also include the start of an error handling routine. A conditioned branch to an error handling routine, if embodied in the abbreviated jump field of the present invention, could enhance the error handling capacity of the digital computing system. Error detection can occur more often within a program because use of a conditional branch in an abbreviated jump field does not require addition instructions. This increased level of error detection would enable greater likelihood of early error detection with a consequent greater probability of error recovery.

In general, the use of an abbreviated jump field enables the programmer to greatly increase the utility and compactness of programs, particular microinstruction programs, without the penalty of a great deal of additional hardware.

BRIEF DESCRIPTION OF THE DRAWINGS

These and other objects of the present invention will be further explained in the detailed description below taken in conjunction with the drawings in which.

DETAILED DESCRIPTION OF THE PREFERRED EMBODIMENTS

The present invention relates to an improvement in the speed and operating utility of digital computing systems. The utility of such digital computing systems can be improved in two main ways. First, improvement can be achieved by making operations execute faster. Secondly, improvements in general utility can be made by inhancing the operating capability of the apparatus at its present speed. The best improvements in performance would utilize both techniques at least to some degree.

Figure 1:
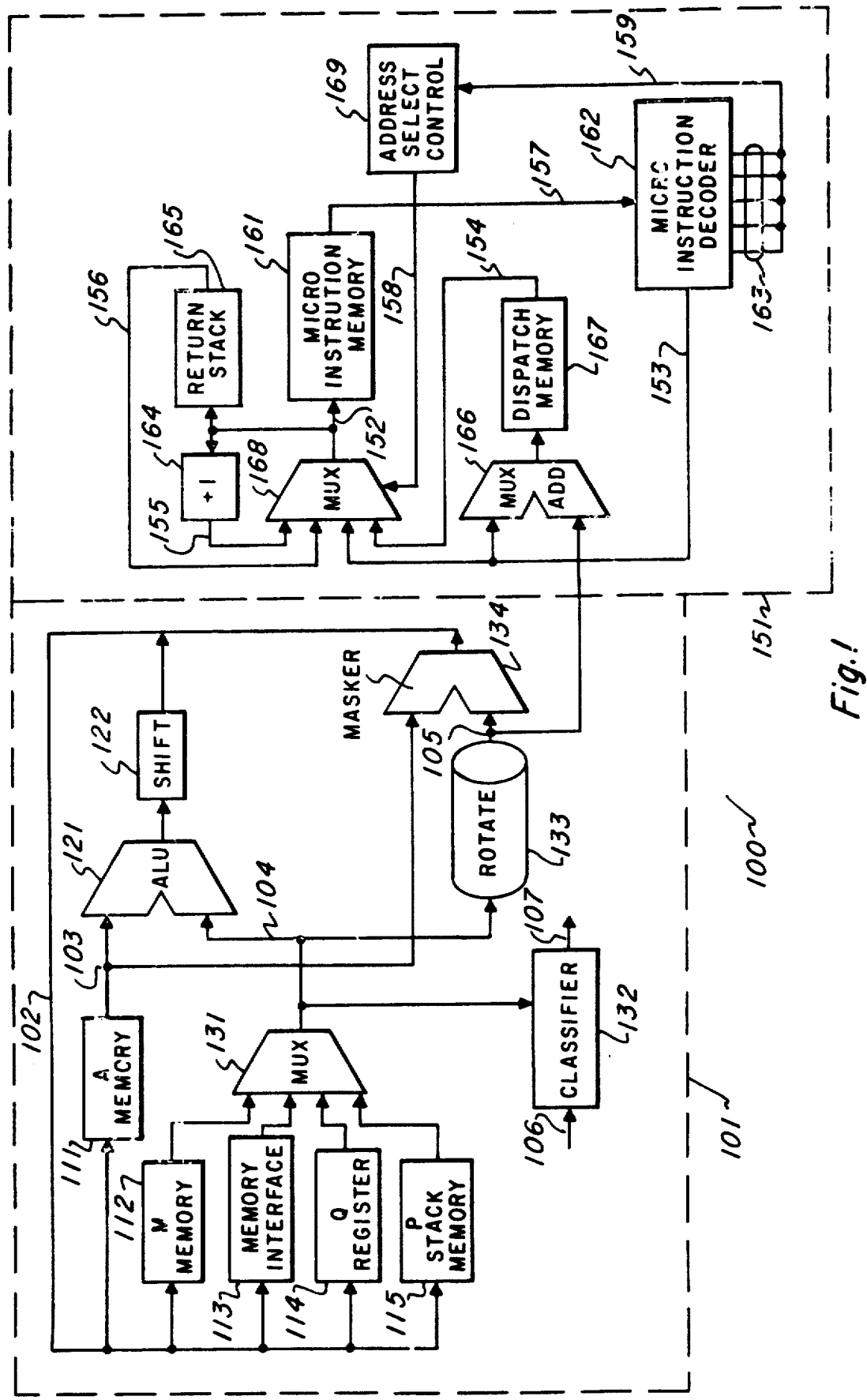
FIG. 1 illustrates a data processing unit such as employed in the digital computing systems to which the present invention is applicable.

FIG. 1 illustrates processing unit 100 which is employed in the digital computing system to which the present invention is applicable. Processing unit 100 includes data processing section 101 and control section 151. Data processing section 101 servies to manipulate data in a manner specified by recalled microinstruction words. Control subsection 151 serves to control the order of execution of microinstruction words.

Data processing subsection 101 includes various memories, data manipulation components and various data buses for transport of data among the various structures. The major data buses within processing subsection 101 include output bus 102, A bus 103, M bus 104 and R bus 105. Output bus 102 comes from the output of shifting means 122 and mask 134 and is applied to various memories within the data processing section 101. A bus 103 couples A memory 111 to arithmetic logic unit 121 and masker 134. M bus 104 couples data from the multiplexer 131 to arithmetic logic unit 121 or barrel rotater 133. R bus 105 couples data from barrel rotater 133 to multiplexer/adder 166 in the control section 151.

The data manipulation within data processing unit 101 occurs in two pair of structures. Arithmetic and logic operations take place in arithmetic logic unit 121 and shifter 122. Masking and shifting operations occur in rotater 133 and masker 134. As stated before, the output of each of these data manipulation structures is connected to the output bus for storage in one of the various memories within the system.

Data processing section 101 includes various memories. A memory 111 has its output applied to one input of both arithmetic logic unit 121 and masker 134. A memory 111 thus serves as one of two operands for the two major data manipulation structures. The other operands for these two data manipulation structures comes from the M bus through multiplexer 131. These memories include M memory 112, memory interface 113, Q register 114 and P stack memory 115. The output of each of these memories is applied to multiplexer 131 which selects one for application to M bus 104. M memory 112 serves as a general purpose addressable memory for the second operand. Memory interface 113 serves to communicate between processing apparatus 100 and the remaining portions of the digital computing system. Data may be loaded into memory interface 113 from other portions of the apparatus for operation via data processing unit 100. Also, data may be stored in memory interface 113 via output bus 102 for transmission to other portions of the digital computing system. P stack memory 115 is a pushdown stack memory which will be more further described below in conjunction with FIG. 5.

Data type classifier 132 is coupled to M bus 104. Data type classifier 132 receives an input indicating a data class on line 106. Data type classifier 132 checks to determine whether the data word currently on M bus 104 is within the data class indicated by the input via line 106. An output is generated on line 107 indicating whether or not the data word from M bus 104 is within the data class.

The major control of the sequence of microinstructions executed is performed by control section 151. Selection of the microinstruction to be recalled from microinstruction memory 161 is via program counter bus 152. Program counter bus 152 is supplied by multiplexer 168. Multiplexer 168 receives address data from bus 153 from microinstruction decoder 162, bus 154 from dispatch memory 157, bus 155 from incrementer 164 and from bus 156 from return stack 165. In accordance with a control signal from address select control 169 via bus 158, multiplexer 168 selects one of these inputs for application to program counter bus 152. This enables selection of the next microinstruction to be recalled from microinstruction memory 161.

The major operation of processing unit 100 takes place in microinstruction decoder 162. Microinstruction decoder 162 receives microinstructions recalled from microinstruction memory 161 via bus 157. Microinstruction decoder 162 generates a plurality of signals on lines 163 which are applied to various portions of the processing unit 100. These various signals set the processing unit 100 in the state selected by the particular microinstruction recalled from microinstruction memory 157. These lines 163 include bus 159 to address select control 169. Address select control 169 operates in accordance with the signals on bus 159 to control multiplexer 168 via bus 158. Address select control 169 controls multiplexer 168 to select the next address applied to microinstruction memory 161. Microinstruction decoder 162 also includes bus 153 which is applied to both multiplexer/adder 166 and to multiplexer 168. During normal operation, address select control 169 enables selection of the address from bus 155. The address on bus 155 is the previous address from program counter bus 152 as incremented by incrementer 164. Thus, as a default condition, the microinstructions within microinstruction memory 161 are recalled in sequential order.

This sequential order is interrupted for a subroutine CALL or subroutine RETURN command. In a subroutine CALL command, portions of the bits from the microinstruction indicate the address of the next microinstruction. These are sensed by microinstruction decoder 162 and sent to multiplexer 168 via bus 153. Address select control 169 enables selection of the address on bus 153 by multiplexer 168. At the same time, the previous address on program counter bus 152 is stored in subroutine return stack 165. These return addresses are stored in a last-in-first-out manner so that they can be recalled in the reverse order of entry. Upon receiving a subroutine RETURN microinstruction, microinstruction decoder 162 causes return stack 165 to recall the last entered return address and apply it to multiplexer 168 via bus 156. Selection of this return address on bus 153 by multiplexer is enabled by address select control 169. Thus, the address on program counter bus 152 returns to the previous address in microinstruction memory 161 prior to the subroutine call.

Microinstruction decoder 162 operates in cooperation with dispatch memory 167 to provide a means for quickly specifying multiple destinations within instruction memory 161. Dispatch memory 167 includes a table of a number of address destinations within microinstruction memory 167 which may be applied to program counter bus 152 via bus 154 and multiplexer 168. Multiplexer 164 selects bus 154 under control of address select control 169 in this case. The place within the table of dispatch memory 167 is selected by the output from multiplexer/adder 166. Multiplexer/adder 166 receives inputs from the R bus 105 of the data processing section 101 and from bus 153 from microinstruction decoder 162. This is a relative address in which the two sources of multiplexer adder 166 are added together to determine the location within the table of dispatch memory 167. It is contemplated that macroinstructions may be executed employing the dispatch memory. Macroinstructions are recalled from a memory not illustrated in FIG. 1 and entered into memory interface 113. During a subsequent instruction cycle, this macroinstruction is applied via multiplexer 131 and M bus 104 to barrel rotater 133 and hence to multiplexer/adder 166 via R bus 105. This data is then applied to select a location within dispatch memory 167. The selected location within dispatch memory 167 has stored therein an address within microinstruction memory 161. This address is applied to microinstruction memory 161 via bus 154, multiplexer 168 and program counter bus 152. This address is the location within microinstruction memory 161 for the first instruction word within microinstruction memory 161 containing the routine for execution of the macroinstruction.

Figure 2:
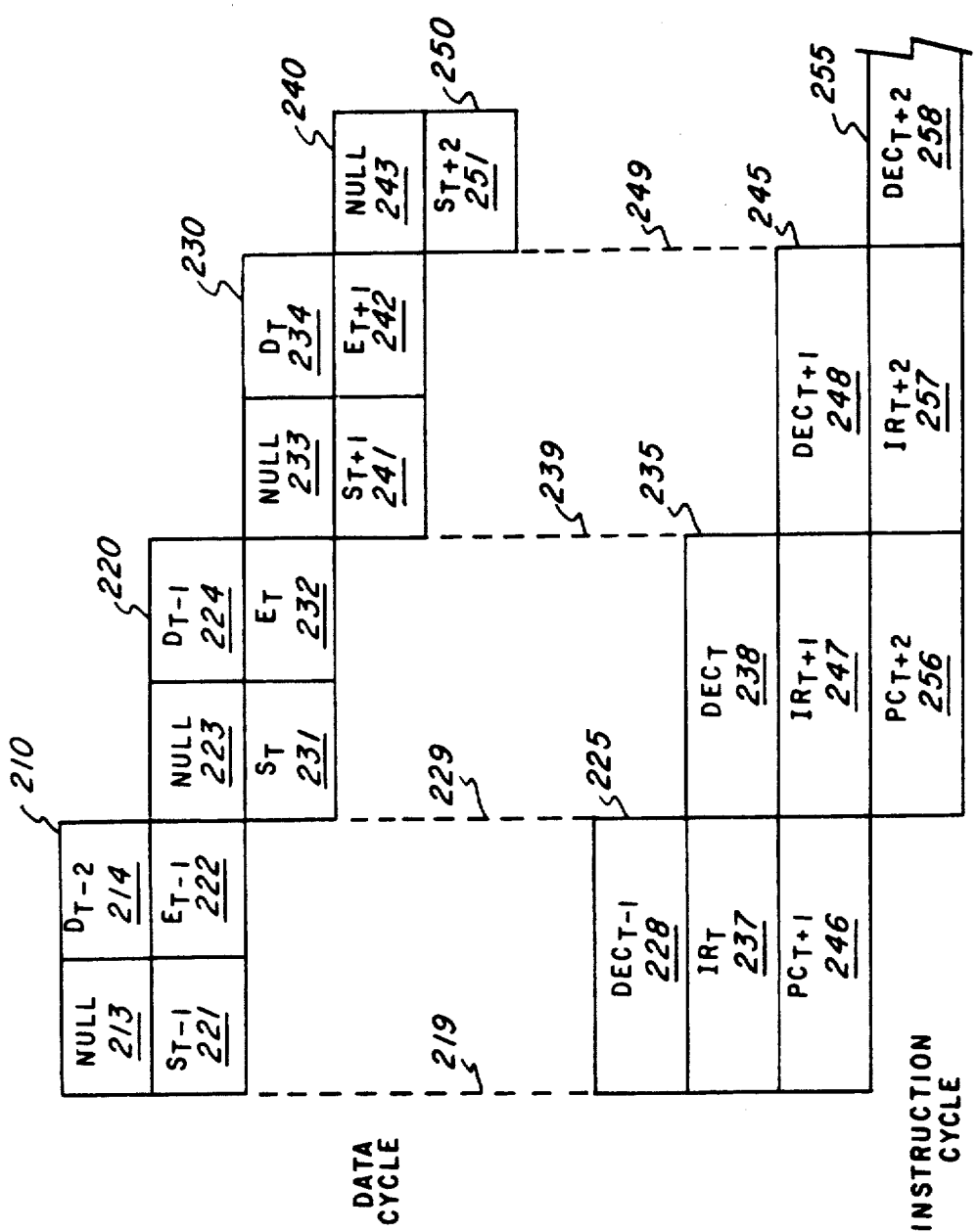
FIG. 2 illustrates schematically the overlap of portions of data cycles and instruction cycles such as employed in the digital computing system to which the present invention is applicable.

FIG. 2 illustrates schematically the operation of the data and instruction pipelines. FIG. 2 illustrates at least portions of instruction cycles T−2, T−1, T, T+1, and T+2. In accordance with the data pipeline used by digital computing systems of this type, each data cycle overlaps a portion of the preceding instruction cycle and the next succeeding instruction cycle. Thus, null phase 213 of instruction cycle 210 overlaps source phase 221 of instruction cycle 220 and destination phase 214 of instruction cycle 210 overlaps execution phase 222 of instruction cycle 220.

Data cycle 230 is typical of each data cycle. Each data cycle is divided into four parts. In the case of data cycle 230, these are source phase 231, execution phase 232, null phase 233 and destination phase 234. During source phase 231, the memories within data processing section 101 containing the desired operands are selected and these operands are recalled. During execution phase 232, the desired data processing operation is performed. This could be either an arithmetic or logic operation, a rotation and masking operation or some form of control operation performed in control section 151. During null phase 233, no operations take place as a part of data cycle 230. This null phase is inserted in data cycle 230 to prevent contention for the same resources when the data cycles are overlapped. During destination phase 234, the memories for the storage of the generated results are designated and the results are stored therein.

As can be noted from FIG. 2, each source phase is overlapped with the null phase of the previous data cycle. Similarly, each execution phase is overlapped with the destination phase of the previous data cycle. As a consequence, each null phase is overlapped with the source phase of the next data cycle and each destination phase is overlapped with the execution phase of the next data cycle. The null phase has been added in order that the destination phase of the previous instruction not overlap with the source phase of the present instruction. Such an overlap would require contention for the memories and buses within data processing subsection 101. This contention for these resources could only be obviated by use of a good deal of parallel hardware. Note that the destination phase, during which the results are stored in selected memory locations does not contend for the same resources as the execution phase and therefore these instruction subcycles can be overlapped.

Occasionally there may be a request for data from a memory location which was written into during the previous data cycle. This causes a problem in recalling the correct data. Note that source phase 231 of data cycle 230 occurs prior to one destination phase 224 of data cycle 220. Thus, if the same memory location is to be employed for the data write operation and the data read operation the correct data would not be stored in the memory location. Data processing apparatuses of this type typically include some means to detect this condition and to pass the data directly to the source phase of the read data cycle without first requiring the data to he written into the memory location.

FIG. 2 also illustrates the operation of the instruction pipeline which operates in conjunction with the data pipeline. The three phases of the instruction cycles overlap in a manner similar to the data cycle. Instruction cycle 245 is typical of the instruction cycles. Instruction cycle 245 begins with program counter phase 246. During program counter phase 246 the address to be applied to program counter bus 152 is selected by multiplexer 168. As noted above, this selection is controlled by address select control 169 which is in turn controlled by microinstruction decoder 162. During instruction register phase 247 the address thus selected is applied to microinstruction memory 161 and the specified microinstruction is recalled. This microinstruction is applied to microinstruction decoder 162 via bus 157. During decode and execution phase 248 the instruction is decoded by microinstruction decoder 162 which then controls other portions of the data processing apparatus via lines 163.

FIG. 2 illustrates that the phases of three differing instructions are pending at one time. Note that decode and execution phase 238 of instruction cycle 235 coincides with both instruction register phase 247 of instruction cycle 245 and program counter phase 256 of instruction cycle 255. Because these phases of the instruction cycle employ differing portions of control subsection 151, there is no contention for resources.

Note times 219, 229, 239 and 249 in FIG. 2. These times denote the occurrances of communication between the data cycles and the instruction cycles. At time 219 decode and execution phase 228 of instruction cycle 225 enables source phase 221 and execution phase 222 of data cycle 220. Similarly, time 229 marks the overlap of decode and execution phase 238 of instruction cycle 235 and source phase 231 and execution phase 232 of data cycle 230. It should also be noted that the data cycle illustrated in FIG. 2 relates primarily to functions of data processing subsection 101 and that the instruction cycle of FIG. 2 relates primarily to functions of control subsection 151.

Figure 3:
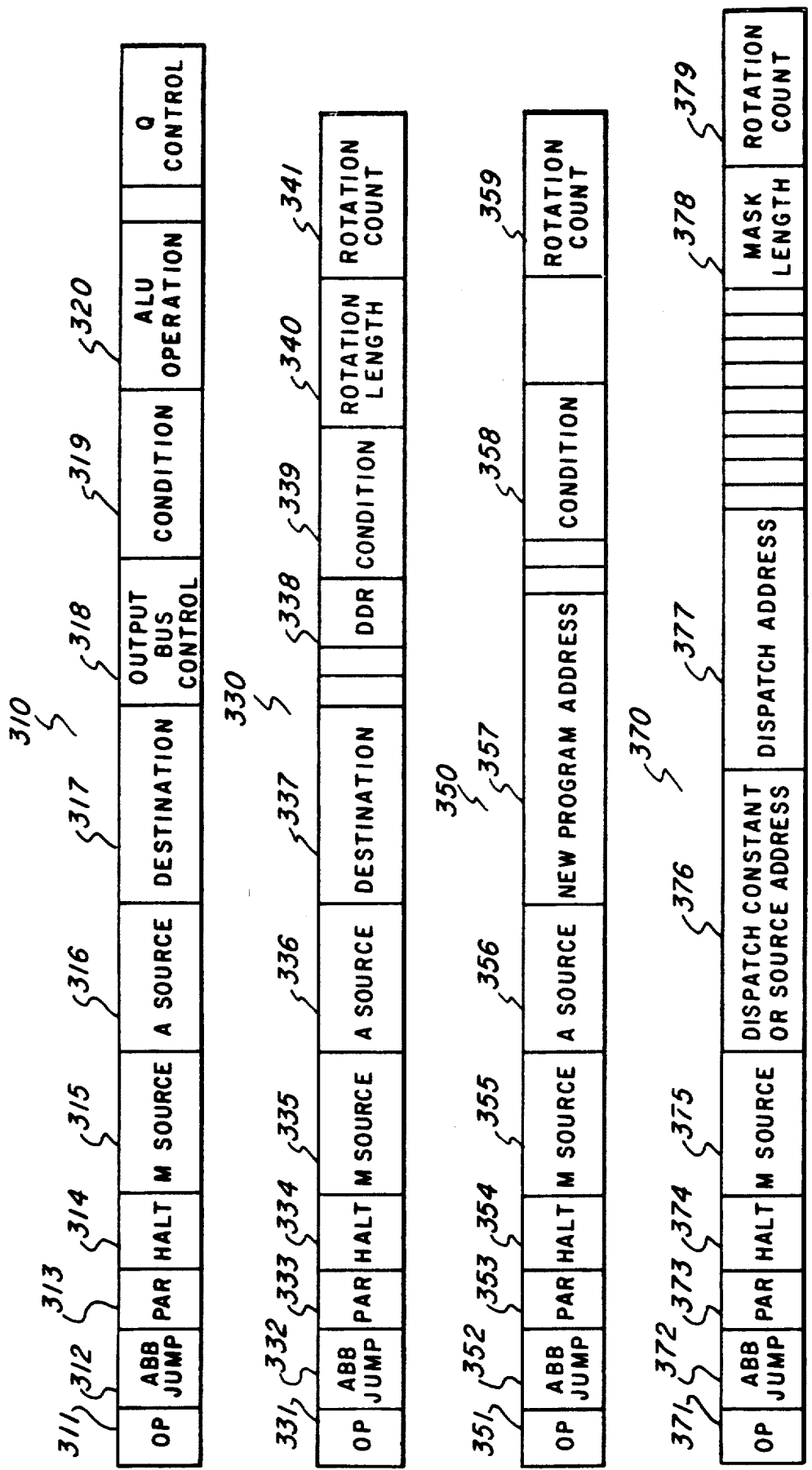
FIG. 3 illustrates the portions of the instruction words employed in the digital computing system of the present invention.

FIG. 3 illustrates the general outlines of four different types of instruction words used in the present invention. These four instruction words include arithmetic logic unit (ALU) instruction word 310, byte instruction word 330, jump instruction word 350 and dispatch instruction word 370. Each of these instruction words includes an operation code prefix of preferably two bits. This is op code 311 of ALU instruction word 310, op code 331 of byte instruction word 330, op code 351 of jump instruction 350 and op code 371 of dispatch instruction word 370. These operational codes preferably include two bits which can uniquely specify each of the four differet types of microinstruction words. The correspondence of bits within operation code field and the type of instruction is illustrated in Table 1.

The next field is the abbreviated jump field 312. This abbreviated jump field enables the ALU instruction word 310 to specify a small number of frequently used jump addresses. The abbreviated jump field will be further described below in conjunction with a detailed description of this feature.

The next portions of ALU instruction word 310 have to do with the logical operation specified by this instruction word. M source field 315 specifies the source of one of the operands of the instruction from among M memory 112, memory interface 113, Q register 114 and P stack memory 115. A source field 316 specifies the location within A memory 111 of the other operand of the operation specified by ALU instruction word 310. Destination field 317 specifies the memory location from among the memories illustrated in FIG. 1 to which the result of the operation is dispatched for storage. This destination could be A memory 111, M memory 112, memory interface 113, Q register 114 or P stack memory 115.

The next fields specify the kind of operation of the ALU instruction word 310. Condition field 319 specifies any conditions to be tested in conjunction with an abbreviated jump operation. This abbreviation jump operation will be further described in detail below. ALU operation field 320 specifies the type of operation to be performed.

Byte instruction word 330 includes many of the same fields as included in ALU instruction word 310. Byte instruction word 330 includes operational code field 331 and abbreviated jump field 332. These portions of byte instruction word operate in the same manner as described above in conjunction with ALU instruction word 310. Similarly, M source field 335, A source field 336 and destination field 337 operate in a manner similar to that described above in conjunction with ALU instruction word 310.

The next fields illustrated in byte instruction word 330 specify functions closely related to the operation of a byte instruction word. The operation of a byte instruction word controls the barrel rotater 133 and masker 134. This is similar to the control arithmetic logic unit 121 and shifter 122 by an ALU instruction word. Field 338 designates the direction of rotation of barrel rotater 133. Condition field 339 designates any conditions to be tested in conjunction with an abbreviated jump operation which will be further described below. This is similar to the condition field 319 noted above in conjunction with ALU instruction word 310. Rotation length field 340 and rotation count field 341 designate the manner in which barrel rotater 133 and masker 134 are employed to generate the desired result. These fields designate the number of bits to be masked and the number of bits rotated.

Jump instruction word 350 includes operational code field 351 and abbreviated jump field 352 which are similar to those described above. Jump instruction word 350 includes M source field 355 and A source field 356. These source fields are employed to select operands in the manner similar to that described above in conjunction with instruction words 310 and 330. New program address field 357 directly specifies the new address within microinstruction memory 161.

A jump instruction may be of three major types, a direct branch, a subroutine call, or a return. These types differ primarily in the manner of operation of return stack 165. In a direct branch instruction return stack 165 is unchanged. In this case the address within microinstruction memory 161 of the presently executing jump instruction is lost. In a subroutine call instruction the address of the currently executing instruction is stored in return stack 165. This is a first-in-last-out stack which is employed to enable return to the address following the call jump instruction. In a return instruction, the address on the top of return stack 165 is recalled and selected by multiplexer 168. This enables the microprogram to return to the point following the calling microinstruction.

In addition, each of these major types of jump instructions have two alternatives. In the first case, the next following microinstruction in the instruction pipeline is not executed. In this event the microinstruction in the instruction pipeline is rendered a no operation instruction by the hardware and this microinstruction cycle is wasted. This is the normal case. In the other case the next following microinstruction in the instruction pipeline is executed prior to the jump operation. This alternative enables use of the otherwise unusable following microinstruction. However, it may not always be possible to have a useful microinstruction following the jump microinstruction. These alternatives are called jump/execute next, call/execute next and return/execute next.

Condition field 158 delineates any conditions to be tested for execution of jump instruction word 350. Rotation count 359 specifies the amount of rotation from barrel rotater 133, in order to properly portion a bit to be tested for a condition in the least significant position for bit test.

Dispatch instruction word 370 includes operational code field 371 and abbreviated jump field 372, which are similar to those fields noted above. Dispatch instruction word 370 includes M source 375 which specifies the location within M memory 112, memory interface 113, Q register 114 or P stack memory 115 from which data is recalled. Dispatch address 377 is combined in multiplexer 166 with the result on the R bus 105 to determine the location within the table of dispatch memory 167. The data at this selected location within dispatch memory 167 is an address within microinstruction memory 161 where the next program instruction word is stored. Mask length field 378 and rotation count field 370 specify the manner in which the data from the data processing section 101 is combined with the dispatch address from control section 151 in order to determine the location within dispatch memory 167. As described previously, this location within dispatch memory 167 specifies an address within microinstruction memory 161. Address select control 169 causes multiplexer 168 to select this address for application to program counter bus 152. Thus the desired microinstruction is specified and recalled from microinstruction memory 161. This type of instruction is particularly useful for decoding of macroinstructions recalled via memory interface 113.

As illustrated in FIG. 3, each of the differing types of instruction words include an abbreviated jump field for specifying a jump operation. The abbreviated jump field included within each instruction word preferably has a limited number of bits for specifying a limited set of the possible destinations within microinstruction memory 161. As illustrated in FIG. 3 and shown in Table 2, in the preferred embodiment, the abbreviated jump field includes three bits.

Table 2 illustrates the meaning of each of the eight differing three bit abbreviated jump codes in the preferred embodiment. Although the preferred embodiment includes an abbreviated jump code of three bits, it would be clearly understood by those skilled in the art that a greater or fewer number of bits may be employed.

The essential feature of the abbreviated jump instruction word is that each instruction word be enabled to transfer control to a limited number of the most frequently employed destinations within microinstruction memory 161. Table 2 details the correspondence between the bits of the abbreviated jump code and the particular destination within instruction word memory 161.

An abbreviated jump code of "000" is decoded as no jump operation. In such an event, the abbreviated jump code does not specify a location within microinstruction memory 161. Thus, if an instruction includes the abbreviated jump code of "000" the default condition of executing the next instruction word within microinstruction memory 161 is followed. This condition is equivalent to the case n which no abbreviated jump codes were provided in the instruction word. That is, this abbreviated jump code corresponds to the normal case in which such an abbreviated jump code were not supported. The instruction thus follows the default state in which the next microinstruction within microinstruction memory 161 would be executed following the present instruction. This particular abbreviated jump code is considered the default state, that is it will be most often used within programs written for the digital computing system.

An abbreviated jump code of "001" corresponds to a conditional skip operation. In the conditional skip operation, the condition codes within the instruction word specify the conditions to be tested for execution of this instruction. In a conditional skip operation, the next following instruction within microinstruction memory 161 would be skipped if the designated condition is true. That is, if the condition is true, then the program would proceed to the second following microinstruction within microinstruction memory 161. In the event that the designated condition is not true, then the next following microinstruction word would be executed normally. This conditional skip operation can be employed, for example, in an absolute value function and in a sticky counter. In an absolute value function the conditional skip would be conditioned upon whether a value was greater than zero. If the value were greater than zero, then the next microinstruction would be skipped. However, if the data was less than zero then the next microinstruction, which would be a change sign or negation microinstruction, would be executed. This enables a very compact program for obtaining the absolute value of a number. In a sticky counter the value is incremented until it sticks at a predetermined value. This could easily be implemented using a conditional skip instruction. The counter increment operation takes place in the conditionally skipped microinstruction. If the counter is less than the predetermined value, then the next microinstruction is executed and the counter is incremented. If the counter equals the predetermined value, then the incrementing microinstruction is skipped and the counter remains stuck on the predetermined value.

An abbreviated jump code of "010" would be decoded as a return operation. As is well known to those skilled in the art, a return operation occurs at the end of a subroutine and serves to return control of operation to the instruction word next following the subroutine call. Execution of a return instruction requires that the location of the last executed call instruction must be recalled from return stack memory 165. This serves to transfer control to the microinstruction within microinstruction memory 161 next following the subroutine call instruction word. Since it is well known that subroutines including such return instructions are often used in well written programs, the capability of executing a return instruction upon execution of any other instruction word could easily eliminate the need for a great number of instruction words.

As noted in Table 2, an abbreviated jump code of "011" corresponds to a return-execute next operation. A return-execute next instruction is equivalent to the previously noted return instruction except that the processor is additionally instructed to execute the next following instruction. This type of operation is particularly useful in a digital computing system which employs a pipelined instruction architecture. In the case of a normal return instruction the next instruction in the pipeline is wasted. This is because the next instruction in the pipeline does not correspond to the next instruction to be executed in accordance with the return operation. An operation such as the return-execute next operation enables the abbreviated jump field of the instruction prior to the end of the subroutine to initiate the return operation. This permits the last instruction of the subroutine then to be executed. It also permits the first instruction to be executed after the subroutine return to be in the instruction pipeline ready for execution at the end of the subroutine. The provision of an abbreviated jump field in each instruction taken in conjunction with a return-execute next operation permits the processor to eliminate the need for a wasted instruction cycle while the transfer of control takes place.

The next abbreviated jump codes, those for jump codes "100" to "111" may be employed for illegal operations or error conditions. As noted in Table 2, the abbreviated jump code "100" is for illegal operations. In the preferred embodiment, this illegal operation location within microinstruction memory 161 includes a shutdown routine which is evoked if some sort of illegal operation is detected. For example, this routine could write certain portions of memory into nonvolatile memory such as a disc or a tape drive. This might, for example, permit later evaluation of the reason for the illegal operational condition and the subsequent computer shutdown. While the program at this destination may not be run very often, it is likely that a well developed applications program would include numerous conditional entrances into this program from many tests for illegal operation check locations.

The abbreviated jump code "101" is listed as a trap operation in Table 2. A trap operation would be something of the sort which would identify and indicate to the user a type of user error. This would be an error of a lesser type than the type requiring system shutdown such as in the illegal operation noted above. Such a destination would include a program which would then signal an error to the user. It would be highly valuable to include conditional branches to this location at many portions within an application program. This is because it is better to catch a user error early in order to insure a greater chance of being able to recover from the error without restarting the program.

Similarly, Table 2 indicates that an abbreviated jump code of "110" corresponds to the operation of bus error. This abbreviated jump code could conditionally branch to a special bus error handling routine to allow identification and possible recovery from a bus error. Table 2 shows that the abbreviated jump code "111" is currently unused. Although no present use for this abbreviated jump code is contemplated in the present data processing apparatus, the hardware is constructed to identify this abbreviated jump code so that it may be employed in subsequent versions of the microprogram.

Figure 4:
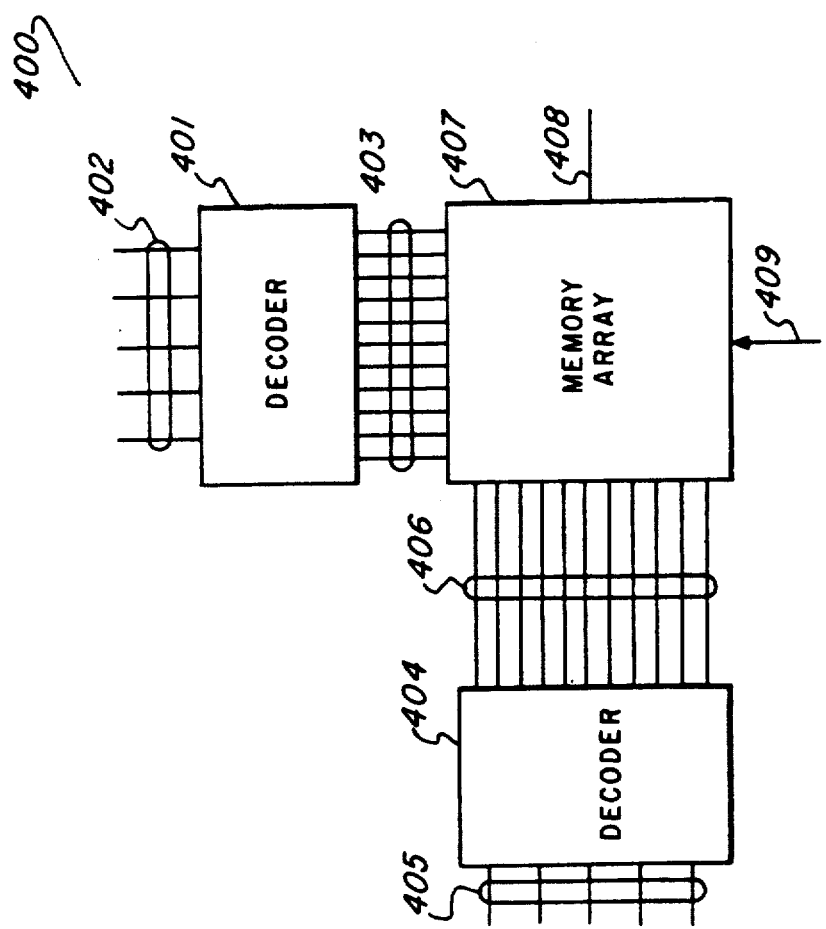
FIG. 4 illustrates the construction of the data type classifier as a memory array.

FIG. 4 illustrates data type classifier 400 which corresponds to data type classifier 132 illustrated in FIG. 1. Data type classifier 400 includes decoders 401 and 404 and memory array 407.

Data type classifier 400 operates as follows. The data type bits from M bus 104 are applied to decoder 401 via lines 402. Lines 402 receive the data type bits of the data word on M bus 104. Decoder 401 decodes this input and generates a signal on one of the column memory address lines 403 coupled to memory array 407.

Similarly, decoder 404 receives the data class input on lines 405. Lines 405 correspond to input 106 illustrated in FIG. 1. Bits indicating the desired data class are applied to lines 405 and hence to decoder 404. Decoder 404 decodes the signal and generates an output on one of the row memory address lines 406.

Memory 407 receives one input from column memory address lines 403 and a second input from row memory address 406. These two address inputs serve to uniquely designate one of the memory cells within memory array 407. In accordance with the preferred embodiment, each memory cell within memory array 407 has a single bit. The single bit selected by address lines 403 and 406 is output from memory 407 via line 408. Line 408 is preferably applied to microinstruction decoder 162 in the same manner as other conditions tested by microinstructon decoder 162. If the particular microinstruction currently being executed is conditional upon the data type class of the data on M memory 104, then this condition will be tested by next instruction microinstruction decoder 162 and appropriate branching will be undertaken. This branching is enabled by address select control 169 causing multiplexer 168 to select the desired address from among the address applied to multiplexer 168.

In one preferred embodiment of the data type classifier, memory array 407 is fixed in a read-only memory. In such an event the relationship between the data types of the data words and the data classifications against which they are tested is fixed. In this event, it is not necessary to provide new data into memory array 407 each time the digital computing system is initialized, because this information is permanently stored within memory array 407.

In another preferred embodiment of the present invention, memory array 407 is composed of read/write memory. In such an event, the contents of memory array 407 must be initialized prior to any use of data type classifier 400. FIG. 4 illustrates data input line 409 which can be used to input data into memory array 407. This data would preferably come from the same source as the particular microprogram and be compatible with that microprogram. That is, it may be that it is desirous to include differing sets of data types within each data class and therefore useful to change the contents of memory array 407 dependent upon the particular application. In addition, it would be possible to reinitialize memory array 407 during the running of a particular application program if it would be desirable to change the relationship between the data classes and the data types. It is contemplated that memory array 407 will be initially loaded with all the data for classification of the data types supported by the currently run higher level language. Some languages such as LISP support a wide variety of data types. In addition it is contemplated that memory array 407 will be supplied with some unused classifications which would permit support of user specified data classes. The provision for enabling memory array 407 to be changed would also enable flexibility within the system microprogram to support the testing of differing data classes than those originally envisioned upon manufacture of the data processing apparatus. In such an event, it would be possible to program processing unit 100 in such a way that memory array 407 is loaded corresponding to the data types that the user has specified.

The provision of data type classifier 400 within a digital computing system enables the rapid testing of whether a particular data word is within a desired data class. This determination can easily support branching decisions, including those initiated by abbreviated jump fields. Previous to this time, it has been the practice to provide tests of set membership in software, that is, writing a short program routine in order to make this test. This provision of this feature in software greatly increased the time required to execute this function and further requires additional program space. Although FIG. 1 illustrates a single data type classifier 132 attached to M bus 104, one skilled in the art would easily recognize that multiple data type classifiers could be employed, each receiving data from a differing bus. Thus, for example, it would be possible to enable branching decisions based upon the data type of data on a plurality of the data buses within the data processing unit 100.

Figure 5:
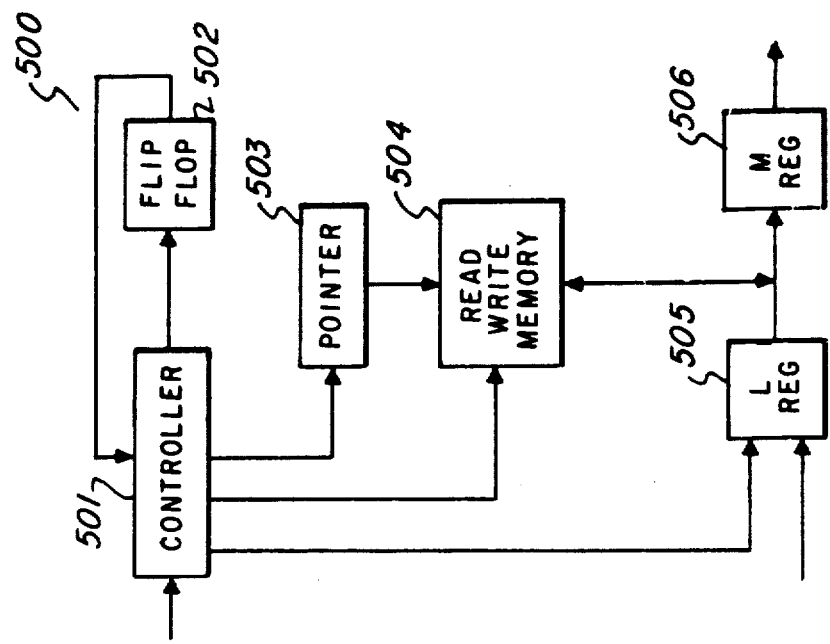
FIG. 5 illustrates the construction of the write/read data stack resolution apparatus.

FIG. 5 illustrates P stack memory 500 which corresponds to P stack memory 115 illustrated in FIG. 1. P stack memory 500 includes a controller 501 which eliminates contention for the top of the memory stack on a write operation followed by a read operation.

P stack memory 500 operates in a last-in-first-out manner. That is, the data stored within P stack memory 500 is read out in reverse order of writing n. The first data written within P stack memory 500 must be the last data recalled from this memory. The only data that can be recalled from the P stack memory 500 is the last data word which had been written into this memory.

A stack memory such as P stack memory 500 typically includes an addressable read/write memory and a controlled address pointer. Read/write memory 504 includes all of the data written into the stack memory. Pointer 503 contains the address of the last data word written into read/write memory 504. When new data is to be written into P stack memory 500, pointer 503 is incremented and the new data written into read/write memory 504 at the new location. When data is to be read from P stack memory 500 it is read from read/write memory 504 at the location indicated by pointer 503 and subsequently pointer 503 is decremented. This serves to place within pointer 503 the address of the next prior data word written into read/write memory 504.

Referring again to FIG. 2, it should be noted that the source phase 241 of instruction 240 occurs prior to the destination phase 234 of instruction 230. This overlapping of the instruction cycle causes a problem in contention for the top of a memory stack such as P stack memory 500 under certain conditions. For example, suppose that an instruction such as instruction 230 requires a write to the P stack memory 500. This write operation would take place during destination phase 234 of instruction 230. Suppose also, that the next following instruction 240 requires a read from the stack memory. Because source phase 241 of instruction 240 occurs prior to destination phase 234 of instruction 230, this read operation would be provided with the incorrect data. In the event that a system such as employing pointer 503 and read/write memory 504 were employed, then pointer 503 would be pointing to the location of the last entered data word prior to the data word to be entered during destination phase 234. Therefore, incorrect data would be supplied during source phase 241.

In accordance with the prior techniques, this contention for the top of the stack memory could be avoided by inserting another instruction between the write instruction and the read instruction. For example, if another sort of instruction were inserted in the place of instruction 240, then instruction 250 would be the read instruction. It can be seen from FIG. 2 that the destination phase 234 of instruction 230 is completely completed prior to source phase 251 of instruction 250. Therefore, the stack memory would be in the proper state to respond correctly to the read instruction. This technique is disadvantageous because it requires the insertion of additional instruction between the write instruction and the read instruction. It is not always possible to be able to provide a useful instruction or instructions between this pair. Therefore, in some instances it may be necessary to insert a useless or no operation instruction in order to prevent problems during the subsequent read operation. Such a no operation instruction is clearly disadvantageous if it could be avoided. In accordance with another prior technique, a hardware function is inserted which ceases operation of the current instruction until the write operation takes place if a write immediately followed by a read is detected. This hardware stop operation preserves program memory space which might otherwise be required for a no operation instruction, however, it also slows operation of the digital computing system and necessitates additional hardware to execute the stop operation.

In accordance with the present invention, controller 501 detects the condition of a write operation immediately followed by a read operation and bypasses storage within the stack memory 500 if this condition is detected. Controller 501 includes the logic to select the type of pointer operation for pointer 503 which may be an increment, a decrement or do nothing. Similarly, controller 501 determines the correct operation for read/write memory 504 which is either read, write or do nothing. Controller 501 sets flip flop 502 in the event that a write operation into read/write memory 504 is necessary. The destination of this write operation is known at the end of the execution phase such as execution phase 232 of instruction 230. At this time the data word is stored within L register 505. If the next following instruction word is not a read instruction, then pointer 503 is incremented and the data stored within the L register 505 is loaded into the designated address within read/write memory 504. Then flip flop 502 is reset indicating that the write operation has been completed.

On the other hand, controller 501 operates differently if the next following operation is a read operation. In the source phase, such as source phase 241 of instruction 240, controller 501 detects the condition of flip flop 502 and whether or not a read operation is desired. If a read operation is desired but flip flop 502 is not set, then the data at the location indicated by pointer 503 is read from read/write memory 504 and supplied to M register 506 for application to multiplexer 131 during the execution phase of the instruction. Next, the pointer 503 is decremented.

If, however, flip flop 502 is set at the time of the read operation, then the data in L register 505 has been scheduled to be stored into read/write memory 504. Thus, the data stored in L register 505 is the data called for by the subsequent read operation. In such an event, controller 501 supplies data from L register 505 directly to M register 506 for later application to the data processing portions of data processing section 101. In such an event, pointer 503 is unchanged and continues to point to the previously last entered data. In addition, flip flop 502 is reset indicating that no write operation to read/write memory 504 is pending. This action takes place because the net result of a write operation followed by a read operation is that the contents of the stack memory is unchanged. This technique permits the data to pass from the execution phase of instruction 230 to the source phase of instruction 240 without being stored in read/write memory 504.

This top of stack bypass operation for P stack memory 500 is particularly useful in conjunction with the abbreviated jump field previously described. The abbreviated jump field previously described enables a return or a return execute next operation from any instruction word. It would be particularly useful to have a return execute next abbreviated jump field in the next to the last instruction of a instruction subroutine. This would enable the next instruction to be executed and then the return operation performed. Such a subroutine may perform as the last operation storage of data into the top of the P stack memory. Without careful control of the instructions occurring at all points following the execution of such a subroutine, the next instruction could easily be a read instruction from the top of the memory stack. In such an event, the undesirable top of stack contention problem would occur. Since this is a difficult problem to detect because the processor may operate normally but provide the wrong data, such a top of stack bypass operation is highly desirable.

TABLE 1

| OPERATION CODE | INSTRUCTION TYPE |
| --- | --- |
| 00 | ALU |
| 01 | BYTE |
| 10 | JUMP |
| 11 | DISPATCH |

TABLE 2

| ABBREVIATED JUMP CODE | OPERATION |
| --- | --- |
| 000 | NO OPERATION |
| 001 | CONDITIONAL SKIP |
| 010 | RETURN |
| 011 | RETURN--EXECUTE NEXT |
| 100 | ILLEGAL OPERATION |
| 101 | TRAP |
| 110 | BUS ERROR |
| 111 | UNUSED |

We claim:
1. A data processing apparatus comprising:
an instruction memory for storing therein a sequence of multiple instruction words, each instruction word specifying a data processing function, each of said instruction words having a limited control field for specifying preselected next possible in- struction words, wherein said limited control fields is an instruction of said multiple instruction words;

a data processing unit for performing data processing functions on data words under control of recalled data instruction words;

an instruction control means for controlling the recall of instruction words from said instruction memory, said instruction control means determining the next sequential instruction to be recalled from said instruction memory based upon the current instruction word in combination with control parameters for said data processing apparatus;

an instruction decode means connected to said data processing unit and to said instruction control means for decoding instruction words recalled from said instruction memory by said instruction control means, wherein said instruction decode means recalls the next instruction word based upon the value found in the limited control field of the current instruction.

2. A data processing apparatus as claimed in claim 1, wherein:

said instruction decode means includes means for recalling the next sequential instruction word in response to a do nothing value in the limited control field, of the current instruction word.

3. A data processing apparatus as claimed in claim 1, wherein:

said instruction decode means includes means for skipping execution of the next sequential instruction word within said instruction memory in response to a skip value in the limited control field of the current instruction word.

4. A data processing apparatus as claimed in claim 3, wherein:

said instruction decode means includes means for skipping execution of the next sequential instruction word within said instruction memory in response to a conditional skip value in the limited control field of the current instruction word if a condition specified by said conditional skip value in the limited control field is true and executing the next sequential instruction word within said instruction memory if said specified condition is false.

5. A data processing apparatus as claimed in claim 1, wherein:

said instruction decode means includes means for executing a subroutine return in response to a return value in the limited control field of the current instruction word.

6. A data processing apparatus as claimed in claim 1, wherein:

said instruction decode means includes means for executing a subroutine return in response to a conditional return value in the limited control field of the current instruction word if a condition specified by the conditional return value in the limited control field is true and executing the next sequential instruction within said instruction memory if said specified condition is false.

7. A data processing apparatus as claimed in claim 1, further comprising:

an instruction pipeline memory for storing instruction words; and means for recalling instruction words prior to the time for their execution and storing said recalled instruction words in said instruction pipeline memory;

wherein said instruction decode means includes means for executing a subroutine return and executing the next sequential instruction word in said instruction pipeline memory in response to a return/execute next value in the limited control field of the current instruction word.

8. A data processing apparatus as claimed in claim 1, further comprising:

an instruction pipeline memory for storing instruction words; and means for recalling instruction words prior to the time for their execution and storing said recalled instruction words in said instruction pipeline memory;

said instruction decode means includes means for executing a subroutine return and executing the next sequential instruction word in said instruction pipeline memory in response to a conditional return/execute next value in the limited control field of the current instruction word if a condition specified by said conditional return/execute next value in the limited control field is true and executing the next sequential instruction within said instruction pipeline memory if said specified condition is false.

9. A data processing apparatus as claimed in claim 1, wherein:

said instruction control means includes means for recalling and executing an instruction word at a preselected location within said instruction word memory to respond to the specification of an illegal operation in response to execution of an instruction word having a conditional illegal operation value in the limited control field if a condition specified by said conditional illegal operation value in the limited control field is true and executing the next sequential instruction within said instruction memory if said specified condition is false.

10. A data processing apparatus as claimed in claim 1, wherein:

said instruction control means includes means for recalling and executing an instruction word at preselected location within said instruction word memory to respond to the determination of an error condition which occurs within said data processing apparatus in response to execution of an instruction word having a conditional error condition value in the limited control field if a condition specified by said conditional error condition limited control field is true and executing the next sequential instruction within said instruction memory if said specified condition is false.

* * * * *